United States Patent
Smith

(10) Patent No.: US 9,709,171 B2
(45) Date of Patent: Jul. 18, 2017

(54) SEALING REDUCING WASHER

(75) Inventor: Lawrence Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 1177 days.

(21) Appl. No.: 12/924,773

(22) Filed: Oct. 4, 2010

(65) Prior Publication Data

US 2012/0080856 A1   Apr. 5, 2012

(51) Int. Cl.

| | |
|---|---|
| *F16J 15/12* | (2006.01) |
| *F16B 43/00* | (2006.01) |
| *F16L 5/06* | (2006.01) |
| *H02G 3/08* | (2006.01) |
| *H02G 3/06* | (2006.01) |

(52) U.S. Cl.
CPC .......... *F16J 15/122* (2013.01); *F16B 43/001* (2013.01); *F16L 5/06* (2013.01); *H02G 3/088* (2013.01); *H02G 3/0675* (2013.01)

(58) Field of Classification Search
USPC .............. 277/624, 611, 638, 644, 650, 651; 411/371.1, 542
See application file for complete search history.

(56) References Cited

U.S. PATENT DOCUMENTS

| | | | |
|---|---|---|---|
| 2,834,998 A * | 5/1958 | Wilder ............................ 52/208 |
| 3,168,321 A | 2/1965 | Glicksman | |
| 3,202,033 A | 8/1965 | Weidner, Jr. | |
| 3,259,404 A | 7/1966 | Papenguth | |
| 3,286,577 A | 11/1966 | Weidner, Jr. | |
| 3,500,712 A | 3/1970 | Wagner | |
| 3,519,279 A | 7/1970 | Wagner | |
| RE27,085 E * | 3/1971 | Weidner, Jr. ............... 411/371.1 |
| 3,588,133 A * | 6/1971 | Caserta ........................ 411/542 |
| 3,606,357 A | 9/1971 | Yonkers | |
| 3,661,046 A | 5/1972 | Waud et al. | |
| 3,796,446 A * | 3/1974 | Shire et al. .................. 285/110 |
| 3,913,925 A * | 10/1975 | Gyory .......................... 277/559 |
| 4,026,183 A * | 5/1977 | Bart ............................. 411/542 |
| 4,085,942 A * | 4/1978 | Yoshida et al. .............. 277/624 |
| 4,149,731 A * | 4/1979 | Yoshida et al. .............. 277/624 |
| 4,161,043 A * | 7/1979 | Flores ......................... 52/302.1 |
| 4,175,756 A * | 11/1979 | Denton et al. ............... 277/644 |
| 4,191,389 A | 3/1980 | Jelinek | |
| 4,280,390 A | 7/1981 | Murray | |

(Continued)

*Primary Examiner* — Eugene G Byrd
(74) *Attorney, Agent, or Firm* — Ware, Fressola, Maguire & Barber LLP

(57) ABSTRACT

A sealing reducing washer is formed from a metallic reducing washer having a front surface, a rear surface, an outer periphery, and an inner periphery with a pliable rim secured over the outer periphery of the metallic reducing washer, a portion of the rim circumferentially depending below the rear surface of the metallic reducing washer adjacent the outer periphery of the metallic reducing washer so as to form a weathertight seal against a surface of an electrical enclosure when the sealing reducing washer is secured to the enclosure, and a pliable toroid circumferentially positioned adjacent the inner periphery of the metallic reducing washer and extending circumferentially above the front surface of the metallic reducing washer in the region adjacent the inner periphery of the metallic reducing washer, the toroid dimensioned to form a weathertight seal with an electrical conduit or raceway.

17 Claims, 4 Drawing Sheets

(56) References Cited

U.S. PATENT DOCUMENTS

| | | | |
|---|---|---|---|
| 4,292,876 A * | 10/1981 | De Graan | 411/542 |
| 4,322,175 A * | 3/1982 | Szczesny | 403/134 |
| 4,702,657 A | 10/1987 | Jelinek | |
| 4,712,802 A * | 12/1987 | Hewison et al. | 411/542 |
| 5,011,162 A | 4/1991 | Jelinek | |
| 5,020,951 A * | 6/1991 | Smith | 411/107 |
| 5,165,834 A * | 11/1992 | Takenouchi et al. | 411/542 |
| 5,193,960 A | 3/1993 | Fukushima et al. | |
| 5,409,337 A * | 4/1995 | Muyskens et al. | 411/148 |
| 6,173,969 B1 | 1/2001 | Stoll et al. | |
| 6,814,358 B2 * | 11/2004 | Keck | 277/638 |
| 7,059,612 B2 | 6/2006 | Kuribayashi | |
| 7,070,355 B2 * | 7/2006 | Abels et al. | 403/50 |
| 7,077,611 B2 * | 7/2006 | Metschke | 411/371.1 |
| 7,717,434 B2 * | 5/2010 | Blessing et al. | 277/608 |
| 2002/0014747 A1 * | 2/2002 | Yamada et al. | 277/619 |
| 2010/0143076 A1 | 6/2010 | Matsumoto et al. | |

* cited by examiner

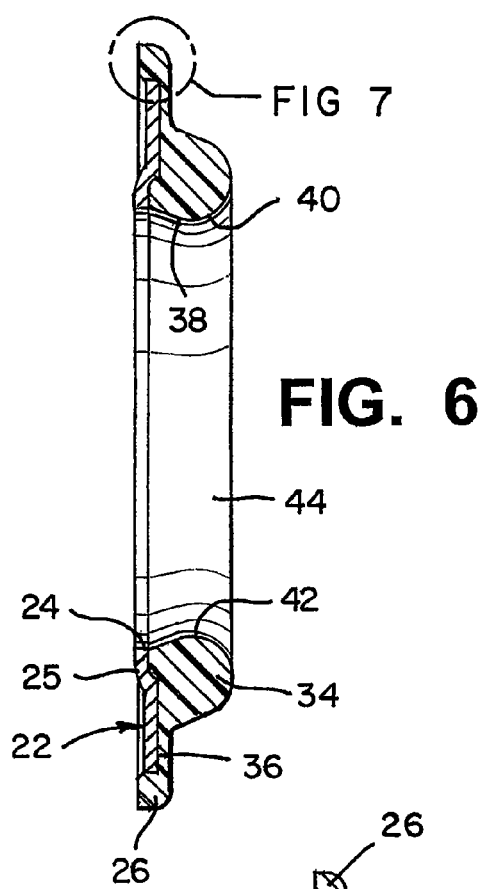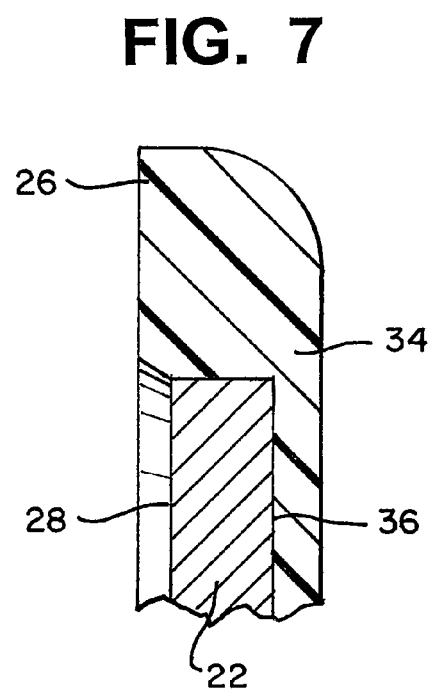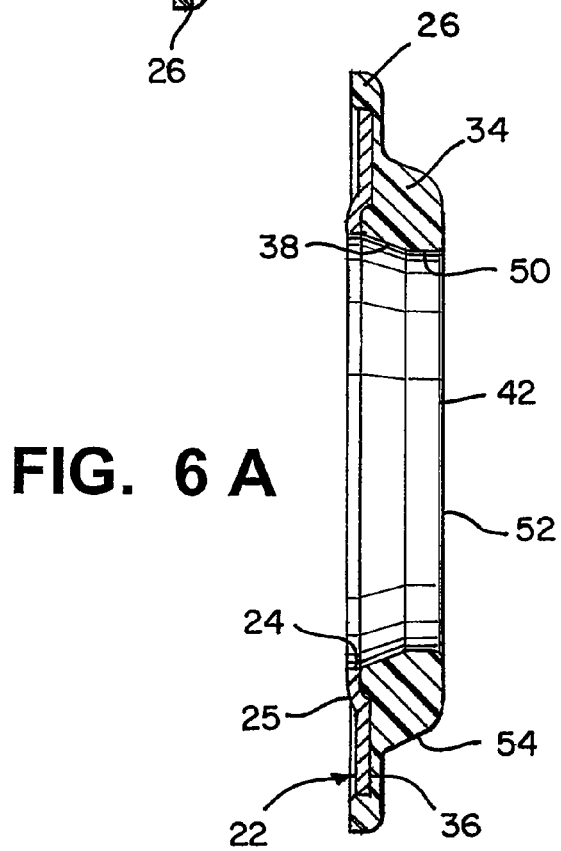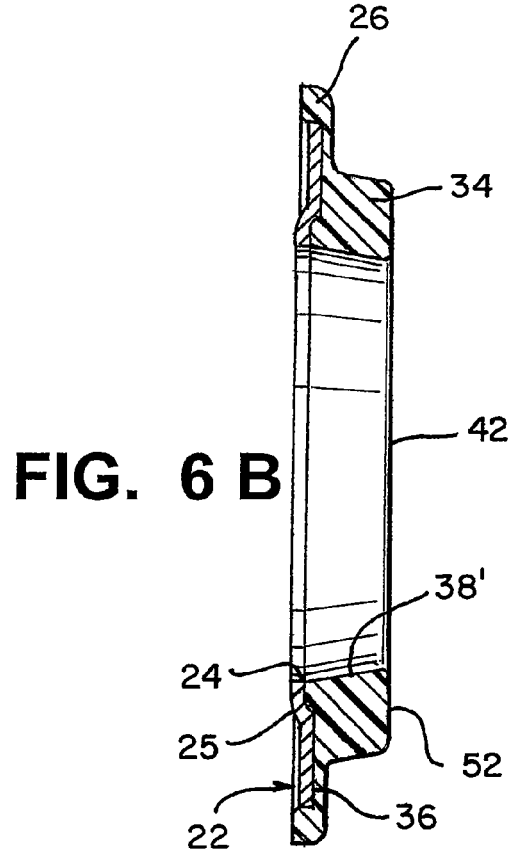

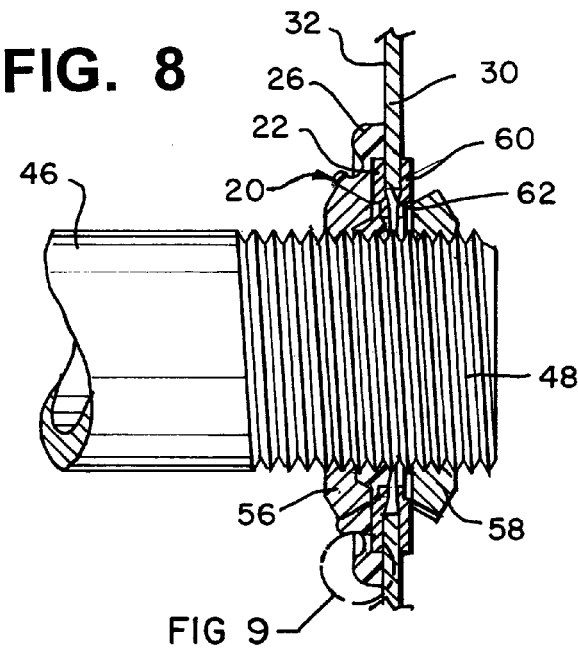
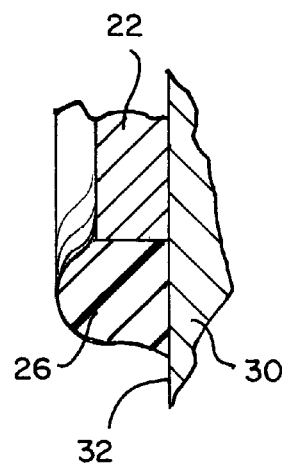
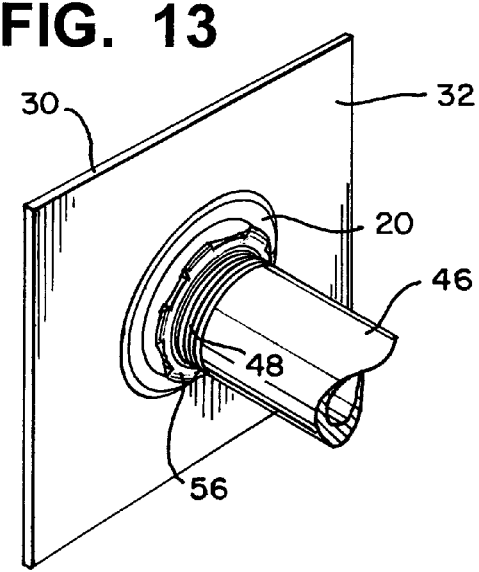
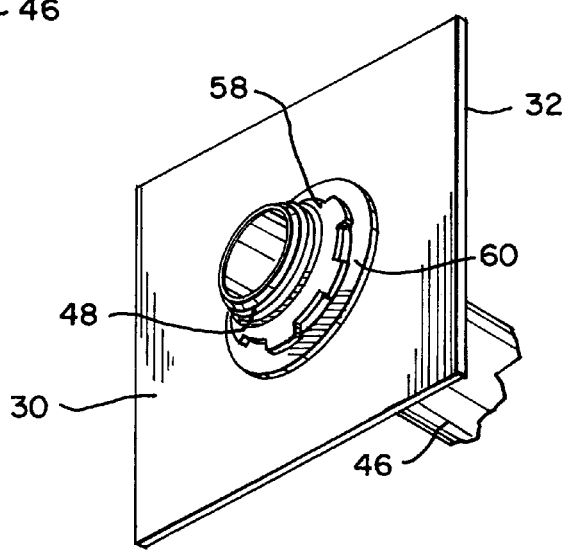

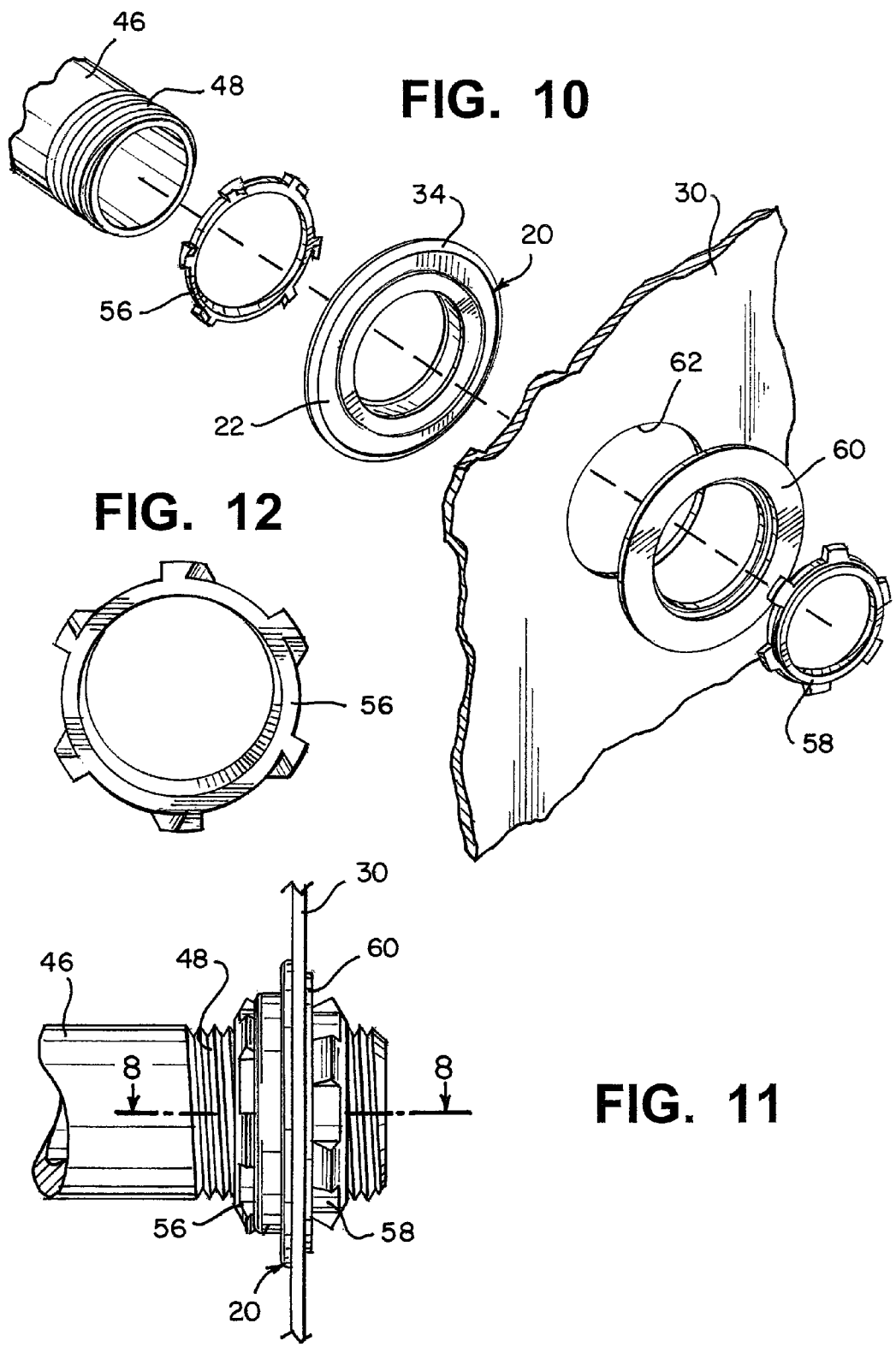

SEALING REDUCING WASHER

TECHNICAL FIELD

The present invention is in the field of reducing washers for use with electrical enclosures having knockout holes.

BACKGROUND OF THE INVENTION

Metallic reducing washers have been used in pairs to reduce a knockout hole in an electrical enclosure or electrical box so as to allow an electrical conduit or raceway to properly fit with respect to the electrical enclosure or electrical box. The reducing washers are able to provide a proper mechanical fit along with electrical bonding between an electrical conduit or raceway having a smaller cross-sectional size than that of a knockout hole (sometimes just called a knockout) in the electrical enclosure. Such situations typically occur where a knockout of a first diameter or size is initially used with an electrical conduit or raceway, but is later to be used with a smaller diameter or size conduit or raceway respectively. The metallic reducing washers thereby provide a mechanical and electrical fit between the smaller conduit or raceway and the larger knockout hole; thereby providing a mechanical and electrical securement of the smaller conduit or raceway to the electrical enclosure or electrical box.

However, when such electrical enclosures are in an outdoor location, for example, electrical installers may attempt to use such metallic reducing washers with sealing locknuts or silicone sealers in order to prevent water intrusion into the electrical box. However, due to the design of such metallic reducing washers, it is virtually impossible to create a weathertight seal using this arrangement of parts. Thus, there is a need for a reducing washer which is able to provide a mechanical and electrical connection of a smaller conduit or raceway to a larger knockout associated with an electrical enclosure and to further provide a weathertight seal to prevent water intrusion or the like into the electrical enclosure.

SUMMARY OF THE INVENTION

The present invention provides such a device; namely, a sealing reducing washer. The sealing reducing washer according to the present invention comprises a metallic reducing washer having a front surface, a rear surface, an outer periphery and an inner periphery, where the rear surface is displaced downwardly in the region adjacent the inner periphery so as to provide for alignment of the sealing reducing washer with a knockout hole of an electrical enclosure. The sealing reducing washer further comprises a pliable rim secured over the outer periphery of the metallic reducing washer, a portion of the rim circumferentially depending below the rear surface of the metallic reducing washer adjacent the outer periphery of the metallic reducing washer so as to form a weathertight seal against a surface of an electrical enclosure when the sealing reducing washer is secured to the enclosure the pliable toroid. The sealing reducing washer further comprises a pliable toroid having a central opening, the toroid circumferentially secured adjacent the inner periphery of the metallic reducing washer and extending circumferentially above the front surface of the metallic reducing washer in the region adjacent the inner periphery, the toroid having a periphery that extends radially inward relative to the inner periphery of the metallic reducing washer so as to have a minimum diameter less than the diameter of the inner periphery of the metallic reducing washer, the toroid dimensioned to form a weathertight seal with treads of an electrical conduit or an outer surface of an electrical raceway when an electrical conduit is positioned through the central opening of the pliable toroid and the sealing reducing washer is secured to the electrical enclosure by locknuts and the like.

The pliable rim and pliable toroid may be formed from an elastomer material.

An embodiment of the sealing reducing washer is where the elastomer material forming the pliable rim and pliable toroid is overmolded with respect to the metallic reducing washer.

An embodiment of the sealing reducing washer is a sealing reducing washer as described above, wherein at least a portion of the rear surface of the metallic reducing washer is uncovered so as to form an electrical connection between the sealing reducing washer and the enclosure when the sealing reducing washer is secured to the enclosure.

An embodiment of the sealing reducing washer is a sealing reducing washer as described above, wherein the sealing reducing washer is positionable over a knockout hole of the electrical enclosure and secured to the enclosure by a first locknut contacting the sealing reducing washer and affixed to an electrical conduit passing through the central opening of the toroid and extending inside the enclosure and secured on an inside of the enclosure by a metallic reducing washer and a second locknut.

An embodiment of the sealing reducing washer is a sealing reducing washer as described above, wherein the elastomer material is selected from the group consisting of silicone, butyl nitrile, and ethylene propylene diene monomer.

An embodiment of the sealing reducing washer is a sealing reducing washer as described above, wherein the metallic reducing washer is formed from a zinc plated steel.

An embodiment of the sealing reducing washer is a sealing reducing washer as described above, wherein the pliable toroid has a curved periphery at a portion thereof that extends from the minimum diameter of the toroid to at least a region of the toroid that is furthest away from the front surface of the metallic reducing washer.

An embodiment of the sealing reducing washer is a sealing reducing washer as described above, wherein the pliable toroid extends radially inward according to a substantially linear slope between the inner periphery of the metallic reducing washer and the minimum diameter of the pliable toroid.

An embodiment of the sealing reducing washer is a sealing reducing washer as described above, wherein the linear slope is approximately 70 degrees relative to a front surface of the metallic reducing washer.

A further embodiment of the sealing reducing washer is a washer as described above, wherein the pliable toroid has a cross-sectional shape as shown in FIG. 6.

An embodiment of the sealing reducing washer is a sealing reducing washer as described above, wherein the pliable toroid extends radially inward according to a substantially linear slope between the inner periphery of the metallic reducing washer and the minimum diameter of the pliable toroid.

Other objects and features of the present invention will become apparent from the following detailed description considered in conjunction with the accompanying drawings. It is to be understood, however, that the drawings are designed solely for purposes of illustration and not as a definition of the limits of the invention (except when specifically referred to), for which reference should be made to the appended claims.

BRIEF DESCRIPTION OF THE DRAWINGS

FIG. 6 is a side cross-sectional view taken along line 6-6 shown in FIG. 2 of the sealing reducing washer.

FIGS. 6a and 6b show alternative configuration to the geometry of a pliable toroid forming part of the sealing reducing washer according to the present invention.

FIG. 7 is an enlarged detailed view of the circled region shown in FIG. 6 of the sealing reducing washer.

FIG. 8 is a side cross-sectional view of the sealing reducing washer as secured to an electrical enclosure via a pair of locking washers and a standard metallic reducing washer, illustrating how a pliable toroid forming part of the sealing reducing washer is urged between the threads of a conduit passing through the sealing reducing washer so as to be secured to the electrical enclosure; thereby forming a weathertight seal when the sealing reducing washer is secured to the electrical conduit and electrical enclosure, and also illustrating a weathertight seal between the pliable rim of the sealing reducing washer and the electrical enclosure.

FIG. 9 is an enlarged detailed view of the circled region shown in FIG. 8; illustrating how the pliable rim of the sealing reducing washer is urged outwardly when the sealing reducing washer is secured to the electrical box as shown in FIG. 8; thereby allowing the metallic reducing washer of the sealing reducing washer to make electrical contact with the electrical box.

FIG. 10 is an exploded assembly view of the components shown in FIG. 8.

FIG. 11 is a side view of the sealing reducing washer similar to FIG. 8, but not in cross-section.

FIG. 12 is a top plan view of a locking washer used in the assembly shown in FIG. 10.

FIG. 13 is a perspective view of the sealing reducing washer attached to an electrical enclosure.

FIG. 14 is a perspective view from inside the electrical enclosure of the sealing reducing washer arrangement shown in FIG. 13.

DETAILED DESCRIPTION

Figure 1:
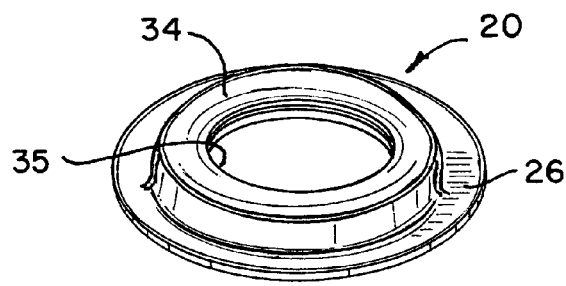
FIG. 1 is a top perspective view of a sealing reducing washer according to the present invention.
Figure 2:
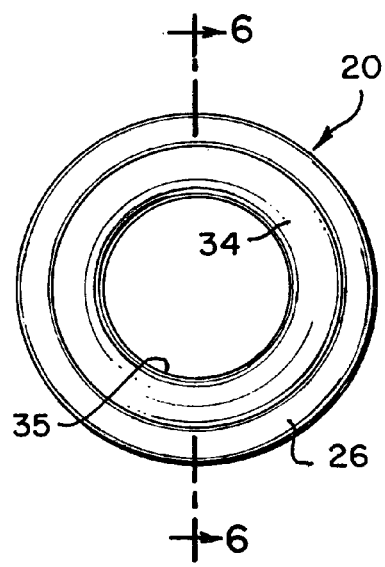
FIG. 2 is a top plan view of the sealing reducing washer according to the present invention.
Figure 3:
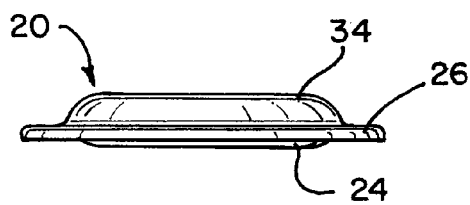
FIG. 3 is a side view of the sealing reducing washer shown in FIGS. 1 and 2.
Figure 4:
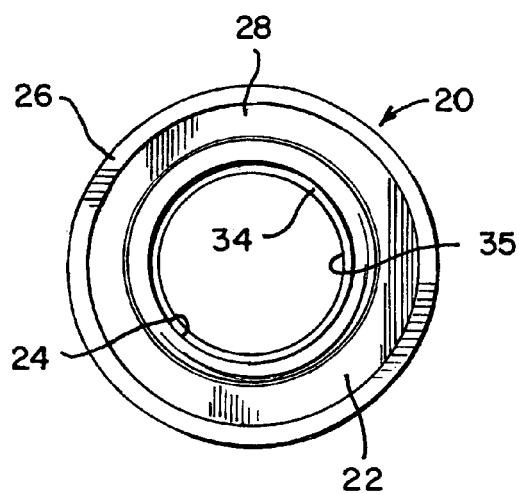
FIG. 4 is a bottom plan view of the sealing reducing washer.
Figure 5:
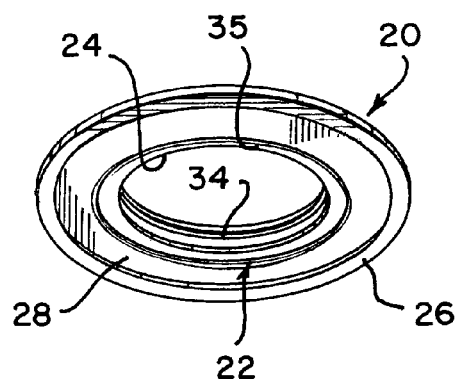
FIG. 5 is a bottom perspective view of the sealing reducing washer according to the present invention.

A sealing reducing washer 20 according to the present invention is seen in a plurality of views, such as FIGS. 1-7. Thus, FIG. 1 shows a top perspective view of the sealing reducing washer. FIG. 6, which is a cross-sectional view taken along lines 6-6 of FIG. 2, shows that the sealing reducing washer has a metallic reducing washer 22 which is sometimes referred to in the industry as a standard reducing washer. This reducing washer has a dished type configuration as illustrated in FIG. 6 with a lower ring portion 25 having a terminating inner periphery 24 defining an opening. The metallic reducing washer can be formed from zinc plated steel.

A pliable rim 26 is positioned over the outer periphery of the metallic reducing washer and, as illustrated in the enlarged sectional view shown in FIG. 7, depends below a rear surface 28 of the metallic reducing washer. Due to the pliable nature of rim 26, when the sealing reducing washer is secured to an electrical enclosure 30 as shown in FIGS. 8 and 9, the rim deforms radially outwardly; thereby allowing the rear surface 28 of the metallic reducing washer 22 to come into mechanical and electrical contact with surface 32 of electrical enclosure 30. In this secured configuration, the pliable rim forms a weathertight seal against the surface 32 of the electrical enclosure as best seen in FIG. 9.

As seen in FIGS. 1-5, and 7, the sealing reducing washer also includes a pliable toroid 34 positioned over a front surface 36 of the metallic reducing washer 22. The pliable toroid is adjacent the inner periphery 24 of the metallic reducing washer and extends upwardly away from the front surface 36 of the metallic reducing washer, as best seen in FIGS. 1 and 6. In an embodiment, the pliable toroid has a first region 38 that radially extends inwardly relative to the inner periphery of the metallic reducing washer. In the embodiment as shown in FIG. 6, this first region of the pliable toroid has a substantially linear slope. This slope may have an angle of approximately 70 degrees relative to the front surface 36 of metallic reducing washer 22. The periphery of the toroid further may have a second region 40 which is substantially curved as best seen in FIG. 6. A minimum inside diameter 42 of the periphery of the toroid (i.e., opening 35 of the toroid) may be located at the junction of the first and second regions, while the maximum diameter 44 may be at its furthestmost location away from the front surface 36 of the metallic reducing washer. This arrangement helps guide an electrical conduit 46 or raceway into the opening defined by the toroid and also allows the pliable toroid material to contact threads 48 of the electrical conduit (or outer surface of an electrical raceway) so as to form a weathertight seal between the sealing reducing washer and the conduit as best shown in FIG. 8. It should be noted that although the specific configuration of the periphery of the pliable toroid as shown in FIG. 6 can be utilized, other periphery geometries can also be used provided that there is sufficient pliable material forming the toroid so as to be deformable into the threads of the electrical conduit or surface of the electrical raceway when the sealing reducing washer is secured to an electrical enclosure as shown in FIG. 8.

For example, the periphery of the toroid could be as shown in FIG. 6a where a first region 38 of the periphery is substantially the same as shown in FIG. 6, but where the second region extends vertically 50 and then a third region 52 extends substantially parallel to the plane of the front surface of the metallic reducing washer before descending downwardly in fourth region 54 so as to contact the front surface of the metallic reducing washer.

FIG. 6b shows another alternative embodiment in which the minimum diameter 42 of the opening of the toroid is at the uppermost region thereof and in which the first region 38' extends to the horizontal region 52. Of course, other configurations of the pliable toroid can be utilized, provided that there is sufficient material forming the pliable toroid to be able to contact the threads 48 of the electrical conduit or raceway.

FIG. 10 is an exploded assembly view that illustrates the components used to secure an electrical conduit 46 or electrical raceway to electrical enclosure 30 when utilizing the sealing reducing washer 20 according to the present invention. Thus, in addition to the sealing reducing washer and the electrical conduit, a first locknut 56, a second locknut 58, and a metallic reducing washer 60 are used in the arrangement as shown. FIG. 8 shows a side view of these parts when the electrical conduit and sealing reducing washer are secured to the electrical conduit about a knockout hole 62 (see FIG. 10) formed in the electrical enclosure 30.

FIG. 11 is a side elevational view of FIG. 8.

FIG. 12 illustrates the locknuts 56 and 58 used to secure the sealing reducing washer of the present invention to an electrical enclosure 30 in more detail.

FIG. 13 shows a perspective view of the sealing reducing washer secured to the electrical enclosure 30 as shown in FIGS. 8 and 11. This view is from outside the electrical enclosure. FIG. 14 is a perspective view from inside the electrical enclosure 30.

The pliable rim and pliable toroid are preferably fabricated from an elastomer material, such as silicone, butyl nitrile and ethylene propylene diene monomer. Other elastomer material may be used as well. The pliable rim and pliable toroid can be secured to the metallic reducing washer by overmolding. As seen in FIG. 6, the pliable rim may extend to the pliable toroid so as to completely cover the front surface of the metallic reducing washer 22.

Although the drawings show the sealing reducing washer with a pliable toroid having a minimum inside diameter or opening 35, the toroid can have a non-circular shape with a non-circular opening that can be dimensioned to secure to outside walls of an electrical raceway (non-shown) when such a raceway is positioned into an electrical enclosure. All other aspects of such an embodiment of the present invention correspond to the disclosed herein.

Thus, what has been described is a sealing reducing washer which is able to provide a weathertight seal between an electrical enclosure and an electrical conduit and raceway to be secured thereto by the sealing reducing washer.

It will thus be seen that the objects set forth above, among those made apparent from the preceding description, are efficiently attained and since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The invention has been described above by means of preferred embodiments. It should be noted that there are alternative ways and variations which are obvious to a skilled person in the art and can be implemented without deviating from the scope and spirit of the appended claims, e.g. the direction of the change of the parameter values in the negotiation may be upwards or downwards depending on the meaning of the parameter being negotiated.

Having described what is claimed is:

1. A sealing reducing washer comprising:
    a metallic reducing washer having a front surface, a rear surface, an outer periphery, and an inner periphery having a diameter, wherein the metallic reducing washer is substantially flat planar and wherein the rear surface is displaced downwardly in a region adjacent the inner periphery;
    a pliable rim secured over the outer periphery of the metallic reducing washer, a portion of the rim circumferentially depending below the rear surface of the metallic reducing washer adjacent the outer periphery of the metallic reducing washer so as to form a weathertight seal against a surface of an electrical enclosure when the sealing reducing washer is secured to the enclosure, wherein the pliable rim is configured to deform radially outwardly when the sealing reducing washer is secured to the enclosure, thereby allowing the rear surface of the metallic reducing washer to come into contact with the surface of the electrical enclosure; and
    a pliable toroid having a central opening, the pliable toroid circumferentially secured adjacent the inner periphery of the metallic reducing washer and extending circumferentially above the front surface of the metallic reducing washer in the region adjacent the inner periphery of the metallic reducing washer, the toroid having a periphery that extends radially inward relative to the inner periphery of the metallic reducing washer so as to have a minimum inside diameter less than the diameter of the inner periphery of the metallic reducing washer, the toroid dimensioned to form a weathertight seal with threads of an electrical conduit or an outer surface of an electrical raceway when the electrical conduit/electrical raceway is positioned through the central opening of the pliable toroid and the sealing reducing washer is secured to the electrical enclosure.

2. The sealing reducing washer as defined in claim 1, wherein the pliable rim and pliable toroid are formed from an elastomer material.

3. The sealing reducing washer as defined in claim 2, wherein the elastomer material forming the pliable rim and the pliable toroid are overmolded with respect to the metallic reducing washer.

4. The sealing reducing washer as defined in claim 2, wherein the pliable rim extends inwardly over the front surface of the metallic reducing washer so as to be integrally formed with the toroid.

5. The sealing reducing washer as defined in claim 4, wherein the elastomer material forming the pliable rim and the pliable toroid is overmolded with respect to the metallic reducing washer.

6. The sealing reducing washer as defined in claim 1, wherein at least a portion of the rear surface of the metallic reducing washer is uncovered so as to form an electrical connection between the sealing reducing washer and the electrical enclosure when the sealing reducing washer is secured to the enclosure.

7. The sealing reducing washer as defined in claim 1, wherein the sealing reducing washer is positionable over a knockout hole of the electrical enclosure and secured to the enclosure by a first locknut contacting the sealing reducing washer and affixed to an electrical conduit passing through the central opening of the toroid and extending inside the electrical enclosure and secured on an inside of the electrical enclosure by a metallic reducing washer and a second locknut.

8. The sealing reducing washer as defined in claim 1, wherein the elastomer material is selected from the group consisting of silicone, butyl nitrile and ethylene propylene diene monomer.

9. The sealing reducing washer as defined in claim 8, wherein the metallic reducing washer is formed from a zinc plated steel.

10. The sealing reducing washer as defined in claim 1, wherein the metallic reducing washer is formed from a zinc plated steel.

11. The sealing reducing washer as defined in claim 1, wherein the pliable toroid has a curved periphery at a portion thereof that extends from the minimum inside diameter of the toroid to at least a region of the toroid that is furthest away from the front surface of the metallic reducing washer.

12. The sealing reducing washer as defined in claim 10, wherein the pliable toroid extends radially inward according to a substantially linear slope between the inner periphery of the metallic reducing washer and the minimum inside diameter of the pliable toroid.

13. The sealing reducing washer as defined in claim 12, wherein said linear slope of the pliable washer is approximately 70 degrees relative to a front surface of the metallic reducing washer.

14. The sealing reducing washer as defined in claim 1, wherein the pliable toroid extends radially inward according to a substantially linear slope between the inner periphery of the metallic reducing washer and the minimum inside diameter of the pliable toroid.

15. The sealing reducing washer as defined in claim 1, wherein the pliable toroid has a cross-sectional shape substantially as shown in FIG. 6.

16. The sealing reducing washer as defined in claim 1, wherein the pliable toroid has a non-circular central opening corresponding to the inner periphery of the metallic reducing washer with a minimum inside diameter that is non-circular, the toroid dimensioned to form a weathertight seal with the outer surface of an electrical raceway.

17. The sealing reducing washer as described in claim 1, wherein the pliable toroid has a first region that radially extends inwardly relative to the inner periphery of the metallic reducing washer and a second region that radially extends outwardly relative to the inner periphery of the metallic reducing washer.

* * * * *

UNITED STATES PATENT AND TRADEMARK OFFICE
CERTIFICATE OF CORRECTION

PATENT NO.        : 9,709,171 B2
APPLICATION NO.   : 12/924773
DATED             : July 18, 2017
INVENTOR(S)       : Lawrence J. Smith It is certified that error appears in the above-identified patent and that said Letters Patent is hereby corrected as shown below:

In the Claims

At Column 5, Line 59 in Claim 1, Line 5 the word "flat" should be deleted.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*